United States Patent [19]
Yanagawa et al.

[11] Patent Number: 5,396,569
[45] Date of Patent: Mar. 7, 1995

[54] OPTICAL LINE MONITORING METHOD AND AN APPARATUS PERMITTING SIMULTANEOUS LINE MONITORING AND INFORMATION COMMUNICATION

[75] Inventors: Hisaharu Yanagawa; Takeo Shimizu; Shiro Nakamura; Isao Ohyama; Izumi Sankawa, all of Tokyo, Japan

[73] Assignees: The Furukawa Electric Co., Ltd.; Nippon Telegraph & Telephone Corporation, both of Tokyo, Japan

[21] Appl. No.: 130,354

[22] Filed: Oct. 1, 1993

[30] Foreign Application Priority Data

Oct. 5, 1992 [JP] Japan .................. 4-265795

[51] Int. Cl.6 .................. G02B 6/28; H04J 14/02
[52] U.S. Cl. .................. 385/24; 250/227.15; 250/227.23; 356/417; 359/110; 359/127; 385/12
[58] Field of Search .................. 385/12, 15, 24, 27, 385/31, 39, 45–48; 356/416, 417, 345; 250/227.11, 227.14–227.18, 227.23, 227.19; 359/110, 124, 127

[56] References Cited

U.S. PATENT DOCUMENTS

| | | | |
|---|---|---|---|
| 4,616,137 | 10/1986 | Goff et al. .................. | 250/227.23 X |
| 4,781,427 | 11/1988 | Husbands et al. .................. | 385/24 |
| 4,848,906 | 7/1989 | Layton .................. | 356/345 |
| 4,896,965 | 1/1990 | Goff et al. .................. | 356/417 |
| 5,179,604 | 1/1993 | Yanagawa et al. .................. | 385/24 |
| 5,187,362 | 2/1993 | Keeble .................. | 250/227.15 |

Primary Examiner—John D. Lee
Attorney, Agent, or Firm—Frishauf, Holtz, Goodman & Woodward

[57] ABSTRACT

An optical line monitoring method and an apparatus for locating a failure point in an optical communication system, wherein a plurality of types of inspection light rays having wavelengths which are determined by cut-off wavelengths, which differ from each other, of short-wavelength pass filters installed at a plurality of branched ports of an optical coupler/splitter of the communication system are sent from a light source having variable wavelengths into one or more corresponding optical fiber lines of the system in sequence via an optical directional coupler and the optical coupler/splitter. Each time reflected light, corresponding to the inspection light, from one or more optical fiber lines is received, an output representing the intensity level of the reflected light is sent from a light receiver to an arithmetic circuit and stored in the arithmetic circuit. The arithmetic circuit calculates the reflected light intensity levels which correspond to the individual optical fiber lines according to the light receiver outputs which individually correspond to inspection light rays, whereby the position of the failure in the optical fiber line incurring the failure is identified.

7 Claims, 4 Drawing Sheets

F I G. 4
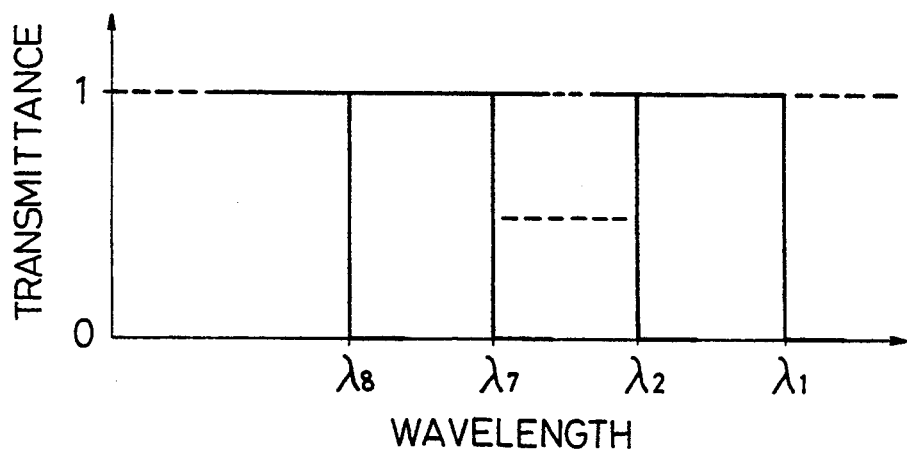
F I G. 5
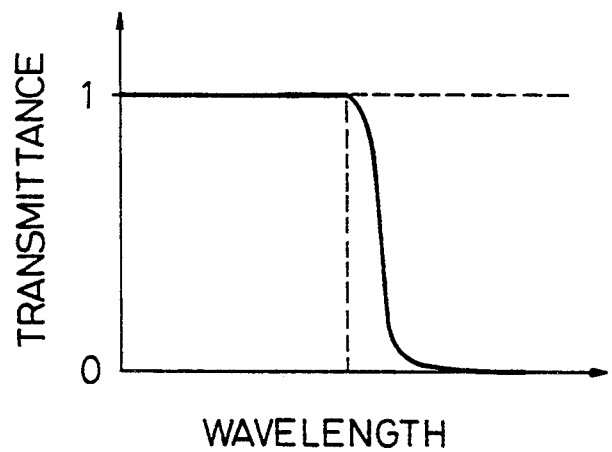

OPTICAL LINE MONITORING METHOD AND AN APPARATUS PERMITTING SIMULTANEOUS LINE MONITORING AND INFORMATION COMMUNICATION

BACKGROUND OF THE INVENTION

The present invention relates to an optical line monitoring method for locating a failure point which has taken place in an optical fiber communication system or in an optical sensor system, and an apparatus therefor.

In a communication system, e.g., a telephone network, an optical fiber line (hereinafter simply referred to as "optical fiber") is occasionally used for a transmission line for connecting a central telephone exchange device with a terminal device. In such a large-scale optical communication system, the system configuring cost would be significantly high if many terminal devices are connected to the office device by optical fibers assigned to the individual terminal devices. To avoid this, a required number of one-input/multiple-output optical couplers/splitters are installed between each of terminal device groups and the office device, and the office device is connected with each optical coupler/splitter through a single optical fiber, for instance, thereby minimizing the cost for configuring the system.

In such an optical communication system, if disconnection or other trouble with the mechanical characteristic or transmission characteristic of an optical fiber occurs, then it is necessary to locate the failure point where the deterioration in the characteristic of the optical fiber has taken place so that proper corrective measures can be taken. For locating such a failure point, most offices are provided with optical pulse testing apparatuses such as OTDRs (optical time domain reflectometers), which operate based on the back-scattering method. A typical OTDR is designed to guide an optical output pulse from a semiconductor laser to an optical fiber to be tested and detect the back-scatter light which has been scattered from the optical fiber and has come back, thereby measuring the loss in the optical fiber.

The aforesaid optical communication system, however, incorporates optical couplers/splitters, and therefore, the use of the OTDR having a light source of a fixed wavelength does not make it possible to specify which of a plurality of optical fibers connected to the optical couplers/splitters has incurred a failure. For this reason, it cannot identify a failure point unless the failed optical fiber has already been found.

To solve the above-mentioned problem, in configuring an optical communication system, it has been suggested to provide the individual output ports of an optical coupler/splitter with band-pass filters which respond to transmission wavelengths or reflection wavelengths that are different from each other, and also to use an OTDR having a light source with a variable wavelength to locate a failure point. According to this suggestion, it is possible to specify an optical fiber incurring a failure and also to locate the failure point in the optical fiber. However, it is difficult to design a filter which always lets information communication light pass through and also properly reflects the monitoring test light. In addition, performing information communication and monitoring at the same time causes mutual interference.

OBJECT AND SUMMARY OF THE INVENTION

An object of the present invention is to provide an optical line monitoring method and an apparatus therefor which allows a failed optical fiber line to be specified among the optical fiber lines connected to an optical coupler/splitter and also the failure point of the optical fiber line to be identified.

According to one aspect of the present invention, there is provided an optical line monitoring method for locating a failure point in an optical system having an optical coupler/splitter and a plurality of optical fiber lines individually connected to a plurality of optical ports of the optical coupler/splitter which are branched from at least one optical port of the optical coupler/splitter.

The optical line monitoring method comprises the steps of: (a) causing inspection light rays, having wavelengths which are determined by cut-off wavelengths, which differ from each other, of short-wavelength pass filter sections (i.e., low pass filter sections) installed at the plurality of optical ports or installed on the plurality of optical fiber lines connected to the optical ports, to enter into one or more corresponding optical fiber lines in sequence via the optical coupler/splitter; (b) detecting and storing an intensity level of a reflected light ray, which corresponds to an inspection light ray entered, each time the reflected light ray comes back from one or more corresponding optical fiber lines; and (c) calculating a reflected light intensity level for each of the optical fiber lines based on the intensity levels of the reflected light rays respectively corresponding to the inspection light rays.

Preferably, the inspection light rays have wavelengths $\lambda 12, \lambda 23, ---, \lambda N(N+1)$ that satisfy a relationship of $\lambda 1 > \lambda 12 > \lambda 2 > \lambda 23 > \lambda 3 > - - -> \lambda N-1 > \lambda(N-1)N > \lambda N > \lambda N(N+1)$, where $\lambda 1, \lambda 2, ---, \lambda N$ respectively represent the wavelengths which correspond to the cut-off wavelengths of the individual filter sections.

Preferably, the reflected light intensity levels Li respectively corresponding to the plurality of optical fiber lines are calculated according to calculation formulas $Li = ki1 \cdot L12 + ki2 \cdot L23 + --- + kiN \cdot LN(N+1)$, where $i = 1, 2, ---, N$, and N denotes a total number of the plurality of optical fiber lines. Further, L12, L23, ---, LN(N+1) denote the reflected light intensity levels corresponding to the inspection light rays of the wavelengths of $\lambda 12, \lambda 23, ---, \lambda N(N+1)$, and each of coefficients ki1, ki2, ---, kiN ($i = 1, 2, ---, N$) is determined according to a wavelength-dependence of an optical transmission loss in a corresponding one of the plurality of optical fiber lines and a characteristic of a corresponding one of the short-wavelength pass filter sections.

According to another aspect of the present invention, there is provided an optical line monitoring apparatus for locating a failure point in an optical system including an optical coupler/splitter having at least one optical port and a plurality of optical ports branched from the at least one optical port, at least one optical fiber line connected to the at least one optical port of the optical coupler/splitter, and a plurality of optical fiber lines individually connected to the plurality of optical ports of the optical coupler/splitter.

The optical line monitoring apparatus comprises: a variable-wavelength light source for generating inspection light rays having wavelengths which are determined according to cut-off wavelengths, which differ from each other, of short-wavelength pass filter sections (i.e., low pass filter sections) installed at the plurality of optical ports of the optical coupler/splitter or installed on the plurality of optical fiber lines connected to the plurality of optical ports; an optical directional coupler, located between the at least one optical fiber and the variable-wavelength light source, for causing the individual inspection light rays from the variable-wavelength light source to enter into one or more corresponding optical fiber lines of the optical system via the optical coupler/splitter; a light receiver for receiving, via the optical coupler/splitter and the optical directional coupler, a reflected light ray, corresponding to an associated one of the inspection light rays, from one or more corresponding optical fiber lines, and for generating an output representing an intensity level of the reflected light ray; an arithmetic circuit for storing outputs of the light receiver and for calculating reflected light intensity levels corresponding to each optical fiber line according to the stored outputs of the light receiver; and a control circuit for controlling operations of the variable-wavelength light source, light receiver, and arithmetic circuit.

Preferably, each of the short-wave band pass filter sections comprises of a dielectric multi-layer film filter which crosses the individual optical ports of the optical system at different crossing angles, and which is common to the plurality of optical ports.

Preferably, the variable-wavelength light source generates the inspection light rays having wavelengths of $\lambda 12, \lambda 23, ---, \lambda N(N+1)$ which satisfy a relationship of $\lambda 1 > \lambda 12 > \lambda 2 > \lambda 23 > \lambda 3 > - - - > \lambda N-1 > \lambda(N-1)N > \lambda N > \lambda N(N+1)$, where $\lambda 1, \lambda 2, ---, \lambda N$ respectively represent the cut-off wavelengths of the individual short-wavelength pass filter sections.

Preferably, the arithmetic circuit calculates the reflected light intensity levels Li respectively corresponding to the plurality of optical fiber lines of the optical system according to calculation formulas $Li = ki1 \cdot L12 + ki2 \cdot L23 + --- + kiN \cdot LN(N+1)$, where $i = 1, 2, ---, N$, and N denotes a total number of the plurality of optical fiber lines. Further, L12, L23, ---, LN(N+1) denote the reflected light intensity levels respectively corresponding to the inspection light rays of the wavelengths of $\lambda 12, \lambda 23, ---, \lambda N(N+1)$, and each of coefficients ki1, ki2, ---, kiN ($i = 1, 2, ---, N$) is determined according to a wavelength-dependence of an optical transmission loss in a corresponding one of the plurality of optical fiber lines and a characteristic of a corresponding one of the short-wavelength pass filter sections.

The present invention is advantageous in that, even in an optical system of a type having short-wavelength pass filters provided in an optical coupler/splitter or provided in optical fiber lines connected thereto, the optical transmission losses in the respective optical fiber lines of the optical system can be separately and independently measured, thus making it possible to easily locate a failure point in this type of optical system. Therefore, according to the present invention, it is unnecessary to use special filters which makes it possible to locate a failure in an optical system including an optical coupler/splitter. Thus, the short-wavelength pass filter is technically well matured, and therefore, it leads to improved operational reliability of the whole optical system. In addition, the short-wavelength pass filters are widely used in the optical communication field and are inexpensive, thus enabling reduced cost for configuring an optical system. Additionally, when a short-wavelength pass filter is used, testing can be conducted without affecting information communication by setting the OTDR testing light wavelength longer than the information communication light wavelength, so that the information communication light always passes through the filter.

According to a preferred embodiment of the present invention, the short-wavelength pass filters installed on a plurality of optical ports of an optical coupler/splitter or installed on a plurality of optical fiber lines connected thereto comprise a dielectric multi-layer filter which is common to the optical ports or the optical fiber lines. This makes it possible to configure the optical system at a lower cost.

BRIEF DESCRIPTION OF THE DRAWING

FIG. 4 is a graph showing a conceptual light transmittance vs. wavelength characteristic of a dielectric multi-layer film filter installed at branching ports of the optical coupler/splitter; and FIG. 5 is a graph showing an actual light transmittance vs. wavelength characteristic of the dielectric multi-layer film filter (short-wavelength pass filter or lowpass filter).

DETAILED DESCRIPTION OF THE INVENTION

Figure 1:
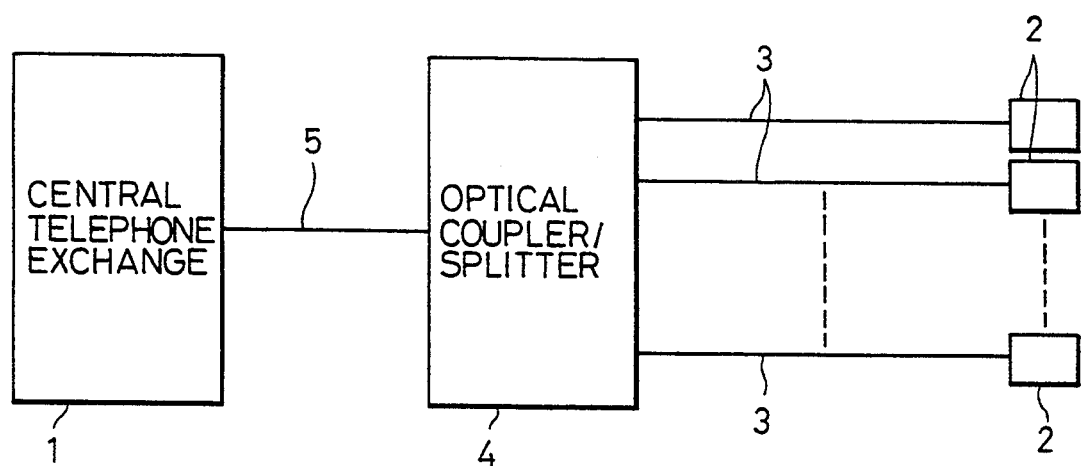
FIG. 1 is a schematic block diagram showing a telephone network as an optical system to which the present invention applies.

A central telephone exchange 1 shown in FIG. 1 is used in a telephone network with many central telephone exchanges which are not shown. A switching system (not shown) installed at the central telephone exchange 1 is connected to many telephones (subscribers' terminal devices) via many transmission lines. One or more transmission lines connected to the central telephone exchange 1 comprise optical fiber lines (one of which is shown by a reference numeral 5 in FIG. 1).

As shown in FIG. 1, one end of each optical fiber line 5 is connected to equipment such as a switching system (not shown) installed at the central telephone exchange 1 via a photoelectric converter (not shown), while the other end of the optical fiber line 5 is optically connected to one side of a 1×N optical coupler/splitter 4 having (N+1) terminals. Connected to the other side of the optical coupler/splitter 4 are N pieces of telephone equipment 2 via N optical fiber lines 3 and photoelectric converters (not shown). The aforesaid optical fiber line 5, optical coupler/splitter 4, and optical fiber lines 3 are included in an optical communication system which connects the central telephone exchange 1 with a group of telephones 2.

Figure 3:
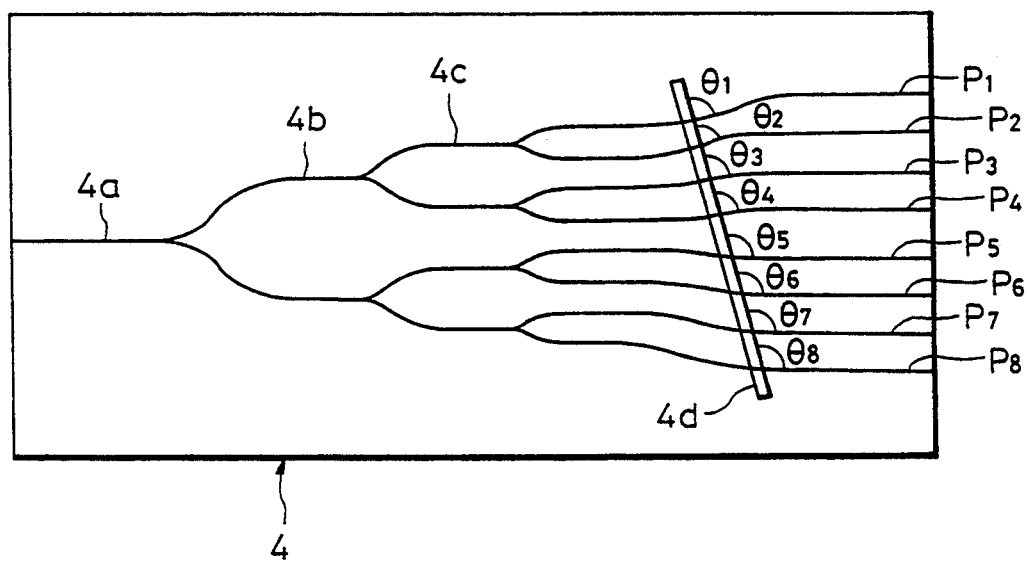
FIG. 3 is a schematic top plan view showing the internal configuration of the optical coupler/splitter shown in FIGS. 1 and 2.

As shown in FIG. 3, the optical coupler/splitter 4 comprises, for example, a 1×8 tree splitter. The optical coupler/splitter 4 has an optical port 4a which is branched into two first intermediate ports 4b. Each of the first intermediate ports 4b is branched into two second intermediate ports 4c, and each second intermediate port 4c is further branched into two branch ports. Thus, the optical port 4a is ultimately branched into eight branch ports P1 through P8 in total. The optical coupler/splitter 4 has a single dielectric multi-layer film filter 4d which is common to the branched ports P1 through P8.

The branched ports P1 through P8 curvedly extend in the lengthwise direction of the optical coupler/splitter 4, while the filter 4d obliquely crosses the branched ports P1 through P8, extending linearly. The filter 4d and the individual branched ports P1 through P8 cross at crossing angles $\Theta 1$ through $\Theta 8$ which differ from each other. For instance, a relationship of $\Theta 1 < \Theta 2 < --- < \Theta 7 < \Theta 8$ exists among the crossing angles $\Theta 1$ through $\Theta 8$. This causes the eight crossing sections of the branched ports P1 through P8 and the dielectric multi-layer film filter 4d to form short-wavelength pass filter sections (see FIG. 5), the cut-off frequencies (cut-off wavelengths) thereof being different from each other so that the branched ports P1 through P8 act as if they were equipped with eight different short-wavelength pass filters. In the light of the fact that a typical optical communication system uses a light having a 1.3 μm wavelength to perform information communication, the cut-off wavelengths $\lambda 1$, $\lambda 2$, - - -, $\lambda 8$ of the filters of the branched ports P1 through P8 are set, for instance, to 1560 nm, 1555 nm, - - -, 1525 nm, respectively.

To make the optical coupler/splitter 4 having the aforesaid structure, a flame hydrolysis deposition method is used to vitrify silica particulates plied up on a silicon substrate, then the vitrified silica particulates are subjected to dry etching, thus forming a silica-based optical waveguides which respectively correspond to the optical port 4a, the first and second intermediate ports 4b and 4c, and the branched ports P1 through P8. Further, slits are made in the sections of the branched ports P1 through P8 where the dielectric multi-layer film filter 4d is to be buried. Also, the dielectric multi-layer film filter 4d is produced by alternately tiering $TiO_2$ and $SiO_2$ on a 20 μm-thick glass substrate. The filter 4d is buried in the slits made in the branched ports P1 through P8, and the filter 4d is fixed in the slits using an optical adhesive agent.

To make it possible to locate a failure in the optical communication system shown in FIG. 1, the central telephone exchange 1 is provided with an OTDR which functions as an optical line monitoring apparatus (optical pulse testing apparatus) according to an embodiment of the present invention. The OTDR is optically connected to the optical communication system via an optical multiplexer/demultiplexer which is not shown (FIG. 2).

Figure 2:
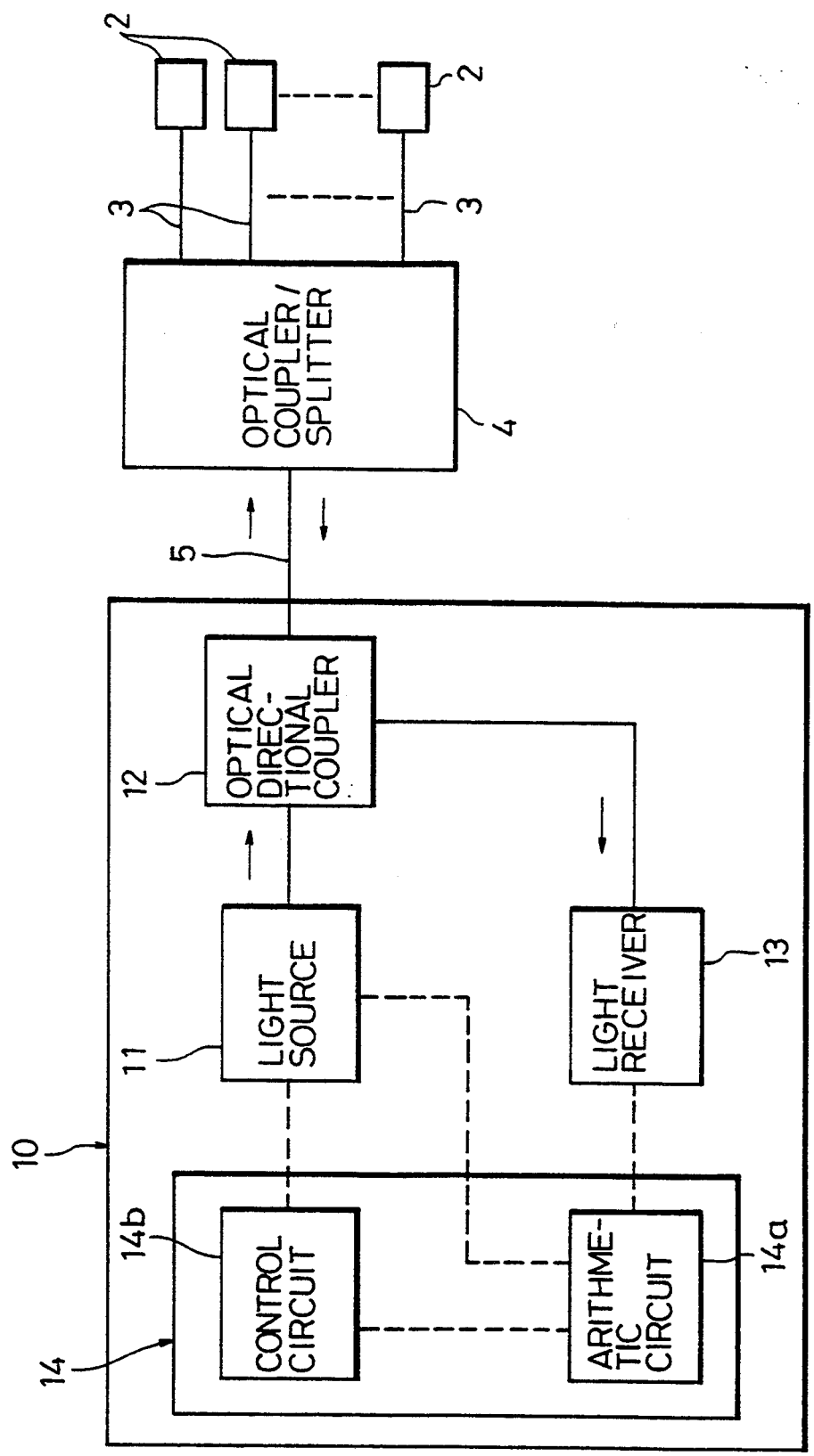
FIG. 2 is a schematic block diagram showing an optical line monitoring apparatus according to an embodiment of the present invention, together with the telephone network.

As shown in FIG. 2, the OTDR 10 comprises a variable-wavelength light source 11. The light source 11 comprises, for instance, a laser diode (not shown) and an external resonator (not shown) comprising a diffraction grating or the like, and is designed to generate inspection light rays for locating a failure. Since the cut-off wavelengths of the filters of the branched ports P1 through P8 range from 1525 to 1560 nm, the light source 11 is arranged to produce inspection light rays of any wavelengths within a range varying from a lower limit wavelength which is shorter than 1525 nm to an upper limit wavelength which is longer than 1560 nm, for instance. An optical directional coupler 12 which comprises a 2×1 feedthrough star coupler having three terminals is optically connected to the light source 11. Optically connected to the optical directional coupler 12 is a light receiver 13 for detecting optical power. The OTDR 10 is further provided with an arithmetic/control circuit unit 14 which is electrically connected to the light source 11 and the light receiver 13.

In the OTDR 10 having the configuration described above, the inspection light from the light source 11 goes into one or more corresponding ones among the N (N=8) optical fiber lines 3 via the optical directional coupler 12, the optical fiber line 5, and the optical coupler/splitter 4. Then, the light reflected from one or more optical fiber lines 3 goes into the light receiver 13 via the optical coupler/splitter 4, the optical fiber line 5, and the optical directional coupler 12. The output of the light receiver 13 which indicates the intensity level of the reflected light is stored in an arithmetic circuit 14a of the circuit unit 14. Further, in the arithmetic circuit 14a, the reflection loss is calculated based on the output of the light receiver 13, as will be discussed later in detail, thus searching for a failure. A control circuit 14b of the circuit unit 14 controls the operation of the whole OTDR 10. For instance, the control circuit 14b variably controls the wavelength of the inspection light.

The following explains the operation of the OTDR 10 shown in FIG. 2.

For instance, when an operator applies a command for starting the search for a failure to the control circuit 14b of the OTDR 10 through a control panel (not shown), the system starts searching for the failure under the control of the control circuit 14b.

In this failure searching process, the drive of the light source 11 is controlled by the control circuit 14b so that the light source 11 generates an inspection light having a wavelength $\lambda 12$ which is shorter than the cut-off wavelength $\lambda 1$ of the short-wavelength pass filter for the branched port P1 but longer than the cut-off wavelength $\lambda 2$ of the filter for the branched port P2. As a result, the inspection light of a wavelength $\lambda 12$ enters the branched ports P1 through P8 of the optical coupler/splitter 4 via the optical directional coupler 12 and the optical fiber line 5.

Since the wavelength $\lambda 12$ of the inspection light is shorter than the cut-off wavelength $\lambda 1$ of the filter of the branched port P1 which is formed in the middle of the port, the inspection light goes into the optical fiber line 3 connected to the branched port P1. On the other hand, since the wavelength $\lambda 12$ of the inspection light is longer than the cut-off wavelengths $\lambda 2$ through $\lambda 8$ of the filters of the branched ports P2 through P8, the inspection light does not enter the optical fiber lines 3 which are connected to the branched ports P2 through P8. The inspection light which has entered the optical fiber line 3, which is connected to the branched port P1, is reflected by the Rayleigh scattering or the like in the optical fiber line 3.

The reflected light is received by the light receiver 13 via the optical coupler/splitter 4, the optical fiber line 5, and the optical directional coupler 12, then the light receiver 13 generates an electric output which represents the intensity level L12 of the reflected light. Under the control of the control circuit 14b, the output from the light receiver 13, which indicates the intensity level of the reflected light received only from the optical fiber line 3 corresponding to the branched port P1, is stored in a memory circuit, not shown, of the arithmetic circuit 14a.

Next, under the control of the control circuit 14b, an inspection light having a wavelength of $\lambda 23$, which is shorter than the cut-off wavelength λ2 of the filter of the branched port P2 but longer than the cut-off wavelength λ3 of the filter of the branched port P3, is sent from the light source 11 only to the two optical fiber lines 3 connected to the branched ports P1 and P2 via the optical coupler/splitter 4. Then, an output representing an intensity level L23 of the reflected light from the two optical fiber lines 3 which correspond to the branched ports P1 and P2 is issued by the light receiver 13 and stored in the arithmetic circuit 14a.

After that, the inspection light rays having wavelengths of λ34, λ45, - - -, λ89 (more generally λN(N+1)) are supplied from the light source 11 to three or more corresponding ones among the eight optical fiber lines 3 in turn in the same manner. Then, the light receiver outputs, which represent the intensity levels L34, L45, - - -, L89 of the reflected light rays from three or more optical fiber lines 3 corresponding to three or more branched ports P1, P2, - - -, P8, are stored in the arithmetic circuit 14a in turn.

Upon completion of the storage of the light receiver outputs which represent the reflected light intensity levels L12, L23, - - -, L89 corresponding to the inspection light rays of wavelengths λ12, λ23, - - -, λ89, the arithmetic circuit 14a reads out the reflected light intensity levels L12, L23, - - -, L89 and the coefficients k11, k12, - - -, k18 from the memory circuit of the arithmetic circuit under the control of the control circuit 14b, then it calculates the reflected light intensity level L1, which corresponds only to the optical fiber line 3 connected to the branched port P1, according to a calculation formula L1=k11·L12+k12·L23+- - - +k18·L89.

Next, in the same procedure, the arithmetic circuit calculates each of the reflected light intensity levels L2 through L8 corresponding only to the optical fiber lines 3 individually connected to the branched ports P2 through P8, respectively, according to a calculation formula Li=ki1·L12+ki2·L23+- - - +ki8·L89, where each of the coefficients ki1, ki2, - - -, ki8 (i=1 through 8) is determined in advance according to the dependence of the light transmission loss on wavelength in a corresponding one of the optical fiber lines 3 and the characteristic of a corresponding one of the short-wavelength pass filter sections and stored beforehand in the memory circuit of the arithmetic circuit 14a.

In calculating the reflected light intensity levels Li, the use of a linear operation based on the calculation formulas Li=ki1·L12+ki2·L23+- - - +kiN·LN(N+1) gives proper considerations to the point that the loss in the transmission of the inspection light along the optical fiber lines depends on wavelength, and to the point that, unlike an ideal light transmittance vs. wavelength characteristic (FIG. 4) in which the transmittance changes from "1" to "0" at the cut-off wavelengths, an actual light transmittance vs. wavelength characteristic (FIG. 5) of each of the filter sections of the branched ports P1 through P8 takes a non-zero value even in an area where the wavelength is longer than the cut-off wavelength. This makes it possible to properly calculate the reflected light intensity levels Li.

When the arithmetic circuit 14a completes the calculation of the reflected light intensity levels L1 through L8 corresponding to the optical fiber lines 3 which are related to the individual branched ports P1 through P8 as described above, it compares the reflected light intensity levels L1 through L8 to specify which optical fiber line of the eight optical fiber lines 3 has incurred a failure, and then calculates the position where the failure has taken place in the optical fiber line according to the reflected light intensity level which corresponds to the optical fiber line having the failure. Further, under the control of the control circuit 14b, a printer or a CRT display unit, not shown, is driven as necessary. This makes it possible to print out or display on the screen as necessary the information which tells the optical fiber line incurring the failure and the failure point in the optical fiber line determined by the arithmetic circuit 14a.

The present invention is not limited to the embodiment described above but it can be implemented in other modifications.

For instance, in the described embodiment, the description was made about an apparatus used for locating a failure in a telephone network which functions as an optical communication system provided with an optical coupler/splitter which includes a 1×8 tree splitter, but the present invention may also be applicable to various optical systems including an optical sensor system and an optical communication system equipped with an optical coupler/splitter having a 1×N or 2×N (N may take any integer) tree splitter or the like.

Additionally, the described embodiment applied to the optical system wherein the short-wavelength pass filter sections are installed at branched ports of the optical coupler/splitter. However, the present invention is also applicable to an optical system wherein such filters are installed on a plurality of optical fiber lines which are connected to the terminal side of the optical coupler/splitter.

What is claimed is:

1. An optical line monitoring method for locating a failure point in an optical system having an optical coupler/splitter and a plurality of optical fiber lines connected to a plurality of optical ports of the optical coupler/splitter which are branched from at least one optical port of the optical coupler/splitter, comprising the steps of:
  (a) causing inspection light rays, having wavelengths which are determined by cut-off wavelengths, which differ from each other, of short-wavelength pass filter sections installed at the plurality of optical ports or installed on the plurality of optical fiber lines connected to the optical ports, to enter into one or more corresponding optical fiber lines in sequence via the optical coupler/splitter;
  (b) detecting and storing an intensity level of a reflected light ray, which corresponds to an inspection light entered, each time the reflected light ray comes back from said one or more corresponding optical fiber lines; and
  (c) calculating a reflected light intensity level for each of the optical fiber lines based on the intensity levels of the reflected light rays respectively corresponding to the inspection light rays.

2. The optical line monitoring method according to claim 1, wherein the inspection light rays have wavelengths λ12, λ23, - - -, λN(N+1) that satisfy a relationship of λ1>λ12>λ2>λ23>λ3> - - - >λN−1>λ(N−1)>λN>λN (N+1), where λ1, λ2, - -, λN respectively represent the wavelengths which correspond to the cut-off wavelengths of the short-wavelength pass filter sections.

3. The optical line monitoring method according to claim 2, wherein the reflected light intensity levels Li respectively corresponding to the plurality of optical fiber lines are calculated according to calculation formulas $Li = ki1 \cdot L12 + ki2 \cdot L23 + \cdots + kiN \cdot LN(N+1)$, where $i = 1, 2, \ldots, N$, N denoting a total number of the plurality of optical fiber lines, $L12, L23, \ldots, LN(N+1)$ denoting the reflected light intensity levels corresponding to the inspection light rays of the wavelengths of $\lambda 12, \lambda 23, \ldots, \lambda N(N+1)$, each of coefficients $ki1, ki2, \ldots, kin$ ($i = 1, 2, \ldots, N$) being determined according to a wavelength-dependence of an optical transmission loss in a corresponding one of the plurality of optical fiber lines and a characteristic of a corresponding one of the short-wavelength pass filter sections.

4. An optical line monitoring apparatus for locating a failure point in an optical system including an optical coupler/splitter having at least one optical port and a plurality of optical ports branched from the at least one optical port, at least one optical fiber line connected to the at least one optical port of the optical coupler/splitter, and a plurality of optical fiber lines individually connected to the plurality of optical ports of the optical coupler/splitter, comprising:

a variable-wavelength light source for generating inspection light rays having wavelengths which are determined according to cut-off wavelengths, which differ from each other, of short-wavelength pass filter sections installed at the plurality of optical ports of the optical coupler/splitter or installed on the plurality of optical fiber lines connected to the plurality of optical ports;

an optical directional coupler, located between the at least one optical fiber and the variable-wavelength light source, for causing the individual inspection light rays from the variable-wavelength light source to enter into one or more corresponding optical fiber lines of the optical system via the optical coupler/splitter;

a light receiver for receiving, via the optical coupler/splitter and the optical directional coupler, a reflected light ray, corresponding to an associated one of the inspection light rays, from one or more corresponding optical fiber lines, and for generating an output representing an intensity level of the reflected light ray;

an arithmetic circuit for storing outputs of the light receiver and for calculating reflected light intensity levels corresponding to each optical fiber line according to the stored outputs of the light receiver; and a control circuit for controlling operations of the variable-wavelength light source, light receiver, and arithmetic circuit.

5. The optical line monitoring apparatus according to claim 4, wherein each of the short-wavelength pass filter sections comprises a dielectric multi-layer film filter which crosses the individual optical ports of the optical system at different crossing angles, and which is common to the plurality of optical ports.

6. The optical line monitoring apparatus according to claim 4, wherein the variable-wavelength light source generates the inspection light rays having wavelengths of $\lambda 12, \lambda 23, \ldots, \lambda N(N+1)$ which satisfy a relationship of $\lambda 1 > \lambda 12 > \lambda 2 > \lambda 23 > \lambda 3 > \cdots > \lambda N - 1 > \lambda(N-1)N > \lambda N > \lambda N(N+1)$, where $\lambda 1, \lambda 2, \ldots, \lambda N$ respectively represent the cut-off wavelengths of the individual short-wavelength pass filter sections.

7. The optical line monitoring apparatus according to claim 6, wherein the arithmetic circuit calculates the reflected light intensity levels $Li$ respectively corresponding to the plurality of optical fiber lines of the optical system according to calculation formulas $Li = ki1 \cdot L12 + ki2 \cdot L23 + \cdots + kiN \cdot LN(N+1)$, where $i = 1, 2, \ldots, N$, N denoting a total number of the plurality of optical fiber lines, $L12, L23, \ldots, LN(N+1)$ denoting the reflected light intensity levels respectively corresponding to the inspection light rays of the wavelengths of $\lambda 12, \lambda 23, \ldots, \lambda N(N+1)$, each of coefficients $ki1, ki2, \ldots, kiN$ ($i = 1, 2, \ldots, N$) being determined according to a wavelength-dependence of an optical transmission loss in a corresponding one of the plurality of optical fiber lines and a characteristic of a corresponding one of the short-wavelength pass filter sections.

* * * * *